United States Patent
Tseng et al.

(10) Patent No.: US 8,464,085 B2
(45) Date of Patent: Jun. 11, 2013

(54) METHOD AND DEVICE FOR CONTROLLING OPERATION OF A PORTABLE ELECTRONIC DEVICE

(75) Inventors: Hui-Jen Tseng, Taipei Hsien (TW); Kai-Chen Lin, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 671 days.

(21) Appl. No.: 12/276,395

(22) Filed: Nov. 23, 2008

(65) Prior Publication Data

US 2009/0144574 A1 Jun. 4, 2009

(30) Foreign Application Priority Data

Dec. 3, 2007 (TW) ................................ 96145940 A

(51) Int. Cl.
*G06F 1/00* (2006.01)

(52) U.S. Cl.
USPC ............ 713/323; 713/300; 713/320; 713/324

(58) Field of Classification Search
USPC .................................. 713/323, 300, 320, 324
See application file for complete search history.

(56) References Cited

U.S. PATENT DOCUMENTS

| | | | |
|---|---|---|---|
| 5,793,358 A * | 8/1998 | Petkovic et al. | 345/168 |
| 6,044,473 A * | 3/2000 | Kim | 713/320 |
| 6,243,819 B1 * | 6/2001 | Jung | 713/320 |
| 7,386,748 B2 * | 6/2008 | Andou | 713/330 |
| 7,707,436 B2 * | 4/2010 | Tsukamoto | 713/300 |
| 7,831,846 B2 * | 11/2010 | Ishidera et al. | 713/300 |
| 7,873,159 B2 * | 1/2011 | Nurmi et al. | 379/433.13 |
| 2007/0030223 A1 * | 2/2007 | Moon | 345/87 |
| 2007/0226609 A1 * | 9/2007 | Sumitomo et al. | 715/522 |

FOREIGN PATENT DOCUMENTS

CN 1869863 A 11/2006

* cited by examiner

*Primary Examiner* — Nimesh G Patel
(74) *Attorney, Agent, or Firm* — Winston Hsu; Scott Margo

(57) ABSTRACT

A method for controlling operation of a portable electronic device includes detecting an angle between a lid of the portable electronic device and a plumb line and controlling the operation of the portable electronic device according to the angle.

24 Claims, 12 Drawing Sheets

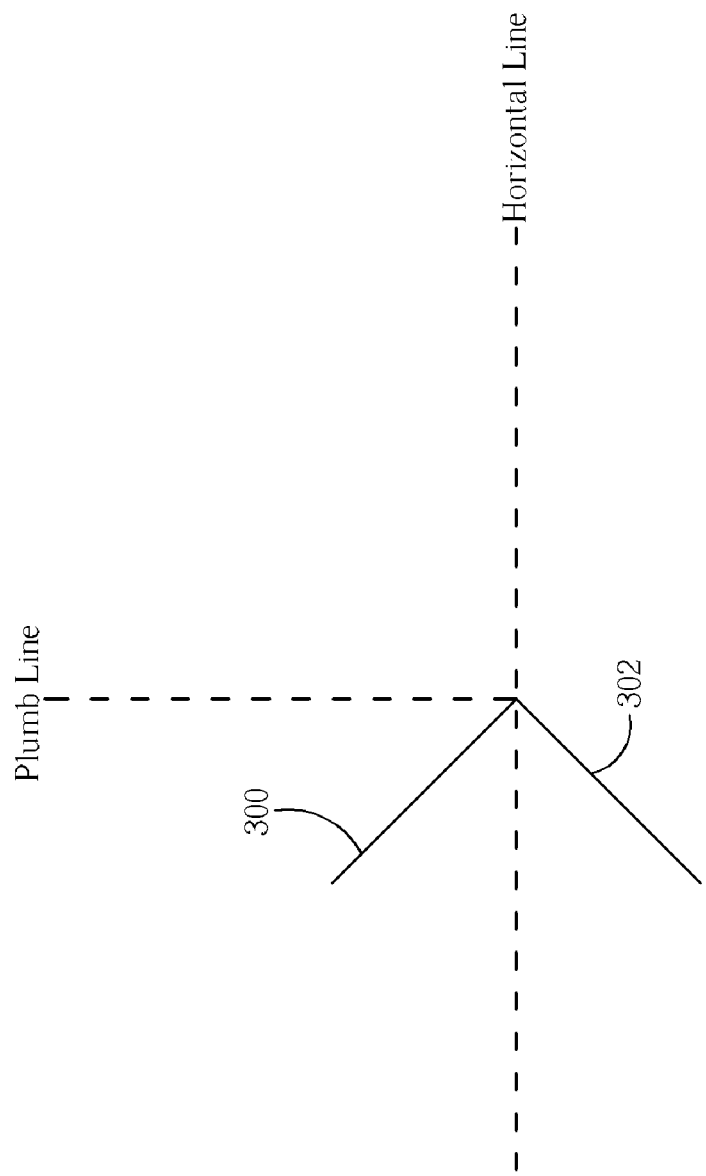

METHOD AND DEVICE FOR CONTROLLING OPERATION OF A PORTABLE ELECTRONIC DEVICE

BACKGROUND OF THE INVENTION

1. Field of the Invention

The present invention relates to a method and related device for controlling operation of a portable electronic device, and more particularly, to a method and related device for determining whether a lid of a portable electronic device is open using a gravitational acceleration sensor and correspondingly determining the operation of the portable electronic device.

2. Description of the Prior Art

A laptop (i.e., a notebook computer) has several advantages, such as a small-sized volume, lightweight, and convenient for carrying due to its portability. These properties allow a user to work in any location. A small, thin, and light notebook computer provides the user with powerful computation abilities and document or multimedia processing functions anywhere and anytime, and thereby the work location of the user is not limited.

Please refer to FIG. 1. FIG. 1 is a schematic diagram of a notebook computer system 10 according to the prior art. Generally speaking, the notebook computer system 10 is composed of a lid 100 and a base 102. A hinge 104 connects the lid 100 and the base 102. The lid 100 comprises a screen, a camera, etc. The base 102 comprises a keyboard, a touchpad, a power switch, a host, an expanding interface, and so on. When using the notebook computer system 10, the user has to turn on the power of the host and adjusts a display angle of the screen of the lid 100 to a specific angle. In order to save power, a switch installed in the notebook computer system 10 can switch ON/OFF states of the screen and operation of the host according to an opening angle of the lid 100. For example, when the user doesn't need to use the notebook computer system 10 after turning on the notebook computer system 10, the user can close the lid 100 to make an angle, between the lid 100 and the base 102, smaller than a specific value, so that the notebook computer system 10 turns off the screen and operates in a sleep mode.

Adjusting the angle between the lid 100 and the base 102, the user can save power and timely switch the operation of the notebook computer system 10. Therefore, it is considerably important to precisely detect the angle between the lid 100 and the base 102. In the prior art, there are many ways to detect the opening angle of the lid 100 and one of these is using a mechanic switch connected to the hinge 104. That is, turning off the screen and executing related operations, e.g. operating in the sleep mode when a rotating angle of the hinge 104 is smaller than a specific angle. However, the assembly of the mechanic switch is difficult and the mechanic switch may weary or malfunction by time, and finally, the reliability of the mechanic switch is decreased.

In addition, a magnetic sensor, such as a Hall sensor or a magnetic reluctance sensor, is used in the prior art. The notebook computer system 10 receives a distance from the lid 100 to the base 102 for determining the angle between the lid 100 and the base 102. For example, the Hall sensor can sense magnetic pole and magnetic force. Therefore, by installing a magnet in the lid 100 and a Hall sensor in the base 102, the notebook computer system 10 can determine the distance between the lid 100 and the base 102 so as to determine the angle between the lid 100 and the base 102. However, it is necessary to take the sensibility of the Hall sensor and magnetic flux of the magnet into account to meet demands when installing the magnet and the sensor. Besides, the magnetic reluctance sensor is difficult to design because of its high sensibility and narrow linear range.

SUMMARY OF THE INVENTION

It is therefore a primary objective of the claimed invention to provide a method and apparatus for controlling the operation of a portable electronic device.

The present invention discloses a method for controlling operation of a portable electronic device comprising detecting an angle between a lid of the portable electronic device and a plumb line, and controlling the operation of the portable electronic device according to the angle.

The present invention further discloses a control device for a portable electronic device comprising a gravitational acceleration sensor installed in a lid of the portable electronic device for detecting an angle between the lid and a plumb line, and a control unit coupled to the gravitational acceleration sensor and a host of the portable electronic device for controlling the operation of the portable electronic device according to the angle.

The present invention further discloses a notebook computer for timely switching the operation for saving power comprising a lid comprising a display, a base comprising a host, and a control device coupled to the lid and the base comprising a gravitational acceleration sensor installed in the lid for detecting an angle between the lid and a plumb line, and a control unit coupled to the gravitational acceleration sensor and the host for controlling the operation of the portable electronic device according to the angle.

The present invention further discloses a method for controlling operation of a portable electronic device comprising detecting a first angle between a lid of the portable electronic device and a plumb line, detecting a second angle between a base of the portable electronic device and the plumb line, and controlling the operation of the portable electronic device according to the first angle and the second angle.

The present invention further discloses a control device for a portable electronic device comprising a first gravitational acceleration sensor installed in a lid of the portable electronic device for detecting a first angle between the lid and a plumb line, a second gravitational acceleration sensor installed in a base of the portable electronic device for detecting a second angle between the base and the plumb line, and a control unit coupled to the first gravitational acceleration sensor, the second gravitational acceleration sensor and a host of the portable electronic device for controlling the operation of the portable electronic device according to the first angle and the second angle.

The present invention further discloses a notebook computer for timely switching the operation for saving power comprising a lid comprising a display, a base comprising a host, and a control device coupled to the lid and the base comprising a first gravitational acceleration sensor installed in the lid for detecting a first angle between the lid and a plumb line, a second gravitational acceleration sensor installed in the base for detecting a second angle between the base and the plumb line, and a control unit coupled to the first gravitational acceleration sensor, the second gravitational acceleration sensor and the host for controlling the operation of the portable electronic device according to the first angle and the second angle.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 12 is a usage diagram of a notebook computer system in FIG. 3 used by a user lying down or needing to look up the notebook computer system.

DETAILED DESCRIPTION

Figure 1:
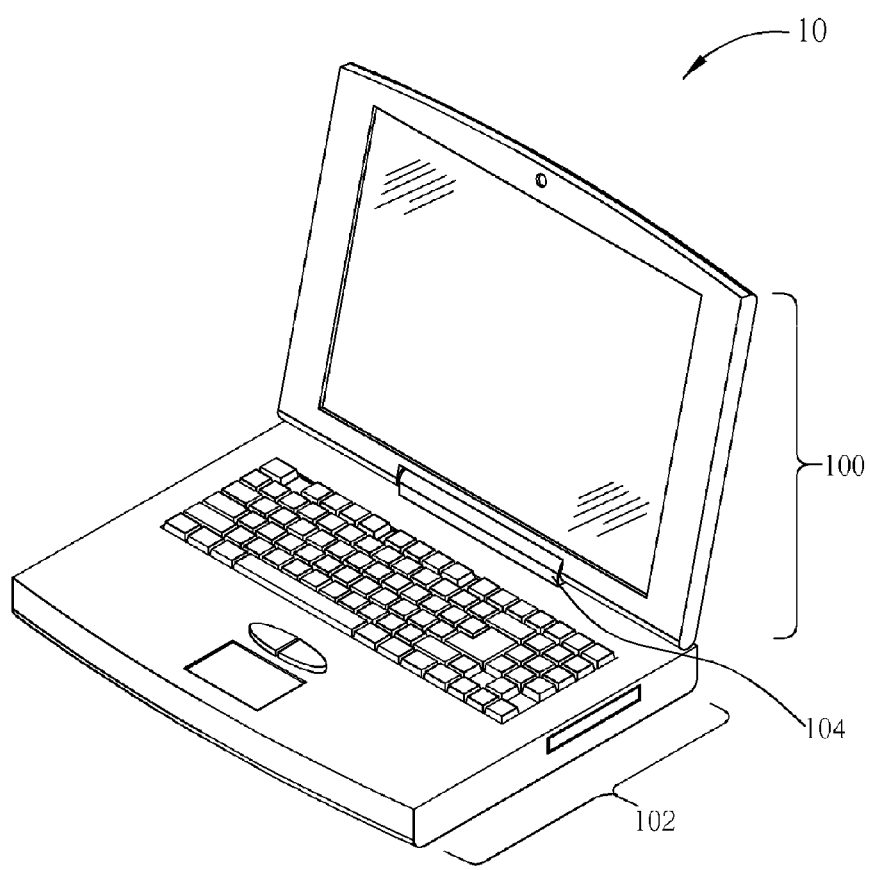
FIG. 1 is a schematic diagram of a notebook computer system according to the prior art.
Figure 2:
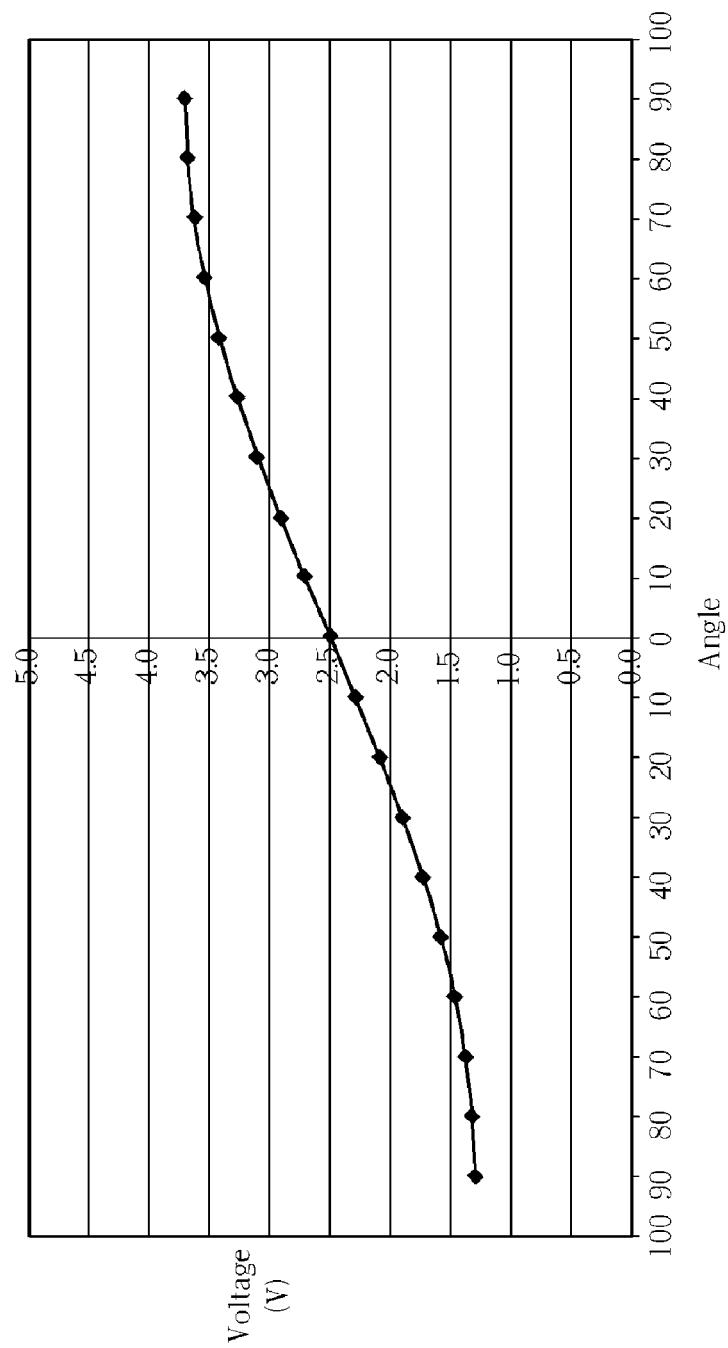
FIG. 2 is a relationship diagram between angles detected by a gravitational acceleration sensor and output voltages.

In order to avoid defects of a mechanic switch and a magnetic sensor, the present invention uses a gravitational acceleration sensor, abbreviated to G-sensor, to receive or determine an angle between a lid of a notebook computer and a plumb line so as to determine whether the lid is open. The angle between the lid of the notebook computer and the plumb line is also known as an absolute angle. As those skilled in the art recognized, in an environment with the gravitational field strength greater than 1 G (G presents the gravitational field strength in the sea level), the gravitational acceleration sensor can be used to sense acceleration, while in an environment with the gravitational field strength smaller than 1 G, the gravitational acceleration sensor can be used to generate different electronic signals, such as voltage signals or current signals according to the absolute angle of the location; therefore, the gravitational acceleration sensor is used to determine angles. The relationship between angles and output voltages is shown in FIG. 2. As shown in FIG. 2, the output voltages of the gravitational acceleration sensor changes by different absolute angles of the location of the gravitational acceleration sensor. According to characteristics of the gravitational acceleration sensor, the present invention precisely determines whether a lid of a portable electronic device is open and correspondingly switches operation of the portable electronic device. Note that, the notebook computer system is an embodiment of the present invention, and other portable electronic devices having a lid and a base, such as a PDA or a smart phone, can be included in the present invention. In addition, the output signals from the gravitational acceleration sensor used in the present invention can be any electric or electronic signals, such as voltage signals and current signals.

Figure 11:
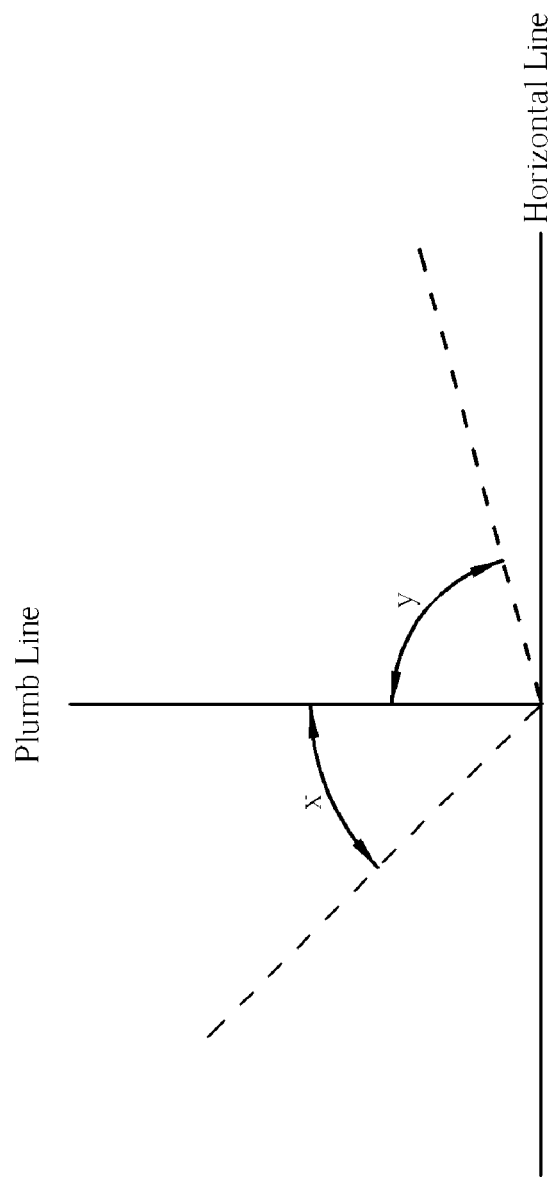
FIG. 11 is a relationship diagram among a plumb line, a horizontal line and the surface of the earth.

To further describe the relationship among a plumb line, a horizontal line and surface of the earth, please refer to FIG. 11. The horizontal line is a virtual line along the horizontal direction in the surface of the earth. The plumb line is a virtual line perpendicular to the horizontal line. The absolute angle in the present invention is an angle corresponding to the plumb line, for example, an angle x is the absolute angle −45° and an angle y is the absolute angle 75°. That is, if a base of a notebook computer is located on the horizontal plane and a lid of the notebook computer is closed, the absolute angle of the lid is −90°. Therefore, whether the lid is open is known by detecting the absolute angle of the lid.

Figure 3:
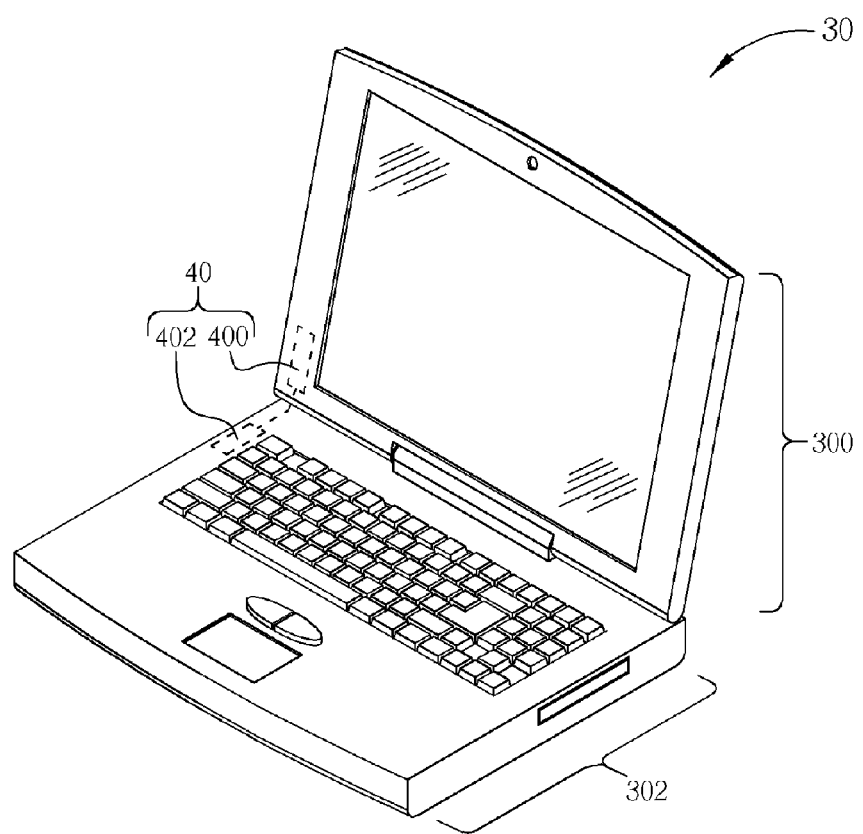
FIG. 3 is a schematic diagram of a notebook computer system according to an embodiment of the present invention.
Figure 4:
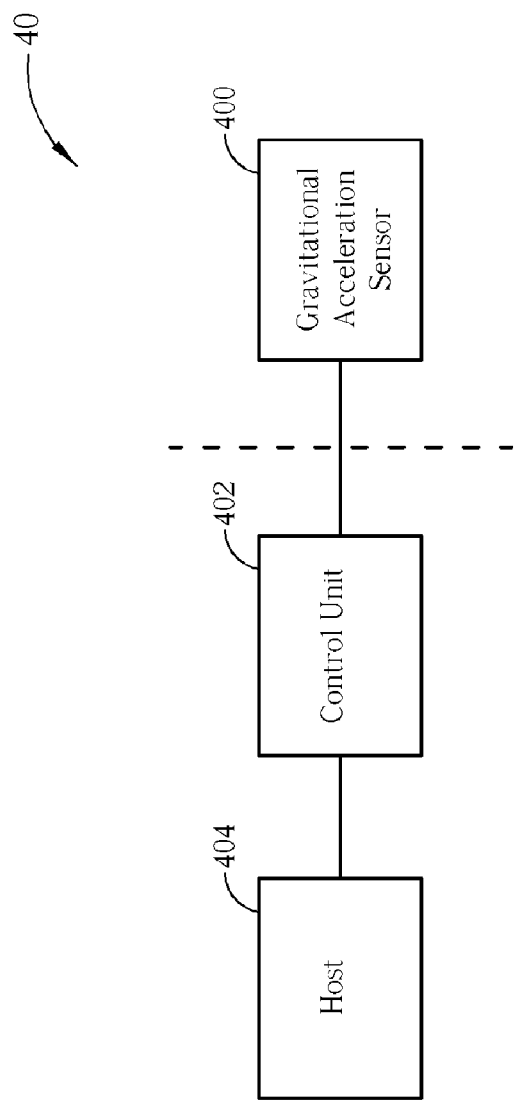
FIG. 4 is a block diagram of a control device in FIG. 3.

Please refer to FIG. 3. FIG. 3 is a schematic diagram of a notebook computer system 30 according to an embodiment of the present invention. The notebook computer system 30 can timely switch operation, so as to save power. The notebook computer system 30 comprises a lid 300, a base 302 and a control device 40. The lid 300 comprises a display, a camera, etc. The base 302 comprises a keyboard, a touch panel, a power switch, a host, an expanding interface, and so on. Please refer to FIG. 4. FIG. 4 is a block diagram of the control device 40. The control device 40 is coupled to a host 404 of the notebook computer system 30 and comprises a gravitational acceleration sensor 400 and a control unit 402. The gravitational acceleration sensor 400 is installed in the lid 300 of the notebook computer system 30 for detecting an angle between the lid 300 and the plumb line and outputting a result, such as voltage signals or current signals, to the control unit 402. The control unit 402 is preferably installed in a keyboard controller of the notebook computer system 30 for controlling the operation of the notebook computer system 30 according to the result detected by the gravitational acceleration sensor 400.

Figure 5:
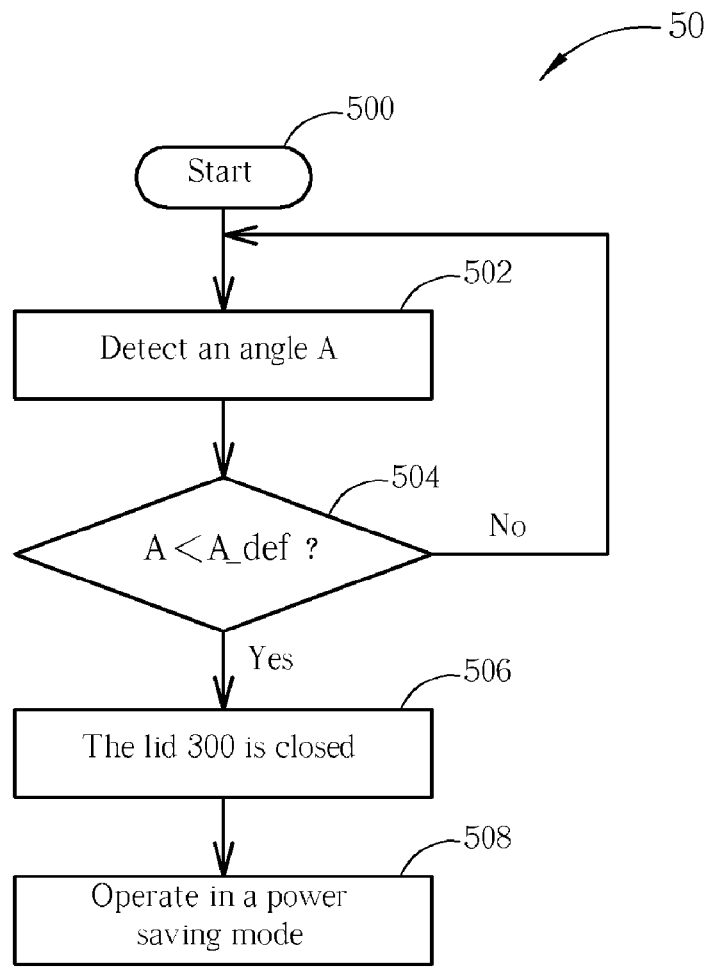
FIG. 5 to FIG. 7 are flowcharts of control procedures according to embodiments of the present invention.

Therefore, via the control device 40, the notebook computer system 30 can calibrate the angle between the lid 300 and the plumb line using the gravitational acceleration sensor 400, so as to determine whether the lid 300 is open. Note that, methods for determining whether the lid 300 is open via the gravitational acceleration sensor 400 are not limited by specific procedures or steps, and those skilled in the art can design demanded determination procedures. For example, please refer to FIG. 5. FIG. 5 is a flowchart of a control procedure 50 according to an embodiment of the present invention. The control procedure 50 is utilized in the control device 40 for controlling the operation of the notebook computer system 30, and comprises the following steps:

Step 500: Start.

Step 502: Detect an angle A between the lid 300 and the plumb line via the gravitational acceleration sensor 400.

Step 504: Compare the angle A with a closing angle A_def by the control unit 402. If the angle A is smaller than the closing angle A_def, perform step 506; else, perform step 502.

Step 506: Determine that the lid 300 is closed.

Step 508: Control the notebook computer system 30 to operate in a power saving mode.

Therefore, using the control procedure 50, when the angle A detected by the gravitational acceleration sensor 400 is smaller than the closing angle A_def, the control unit 402 determines that the lid 300 is closed and controls the notebook computer system 30 to operate in a power saving mode. In this situation, the gravitational acceleration sensor 400 is simply installed in the lid 300 and correspondingly, the gravitational acceleration sensor 400 generates electric or electronic signals, such as voltage signals or current signals (as shown in FIG. 2) according to different value of the angle A. As a result, it is not necessary to worry about mechanic weariness, malfunction, and the location of the gravitational acceleration sensor 400 in the lid 300. Therefore, it is getting easier for designing the gravitational acceleration sensor 400.

Figure 6:
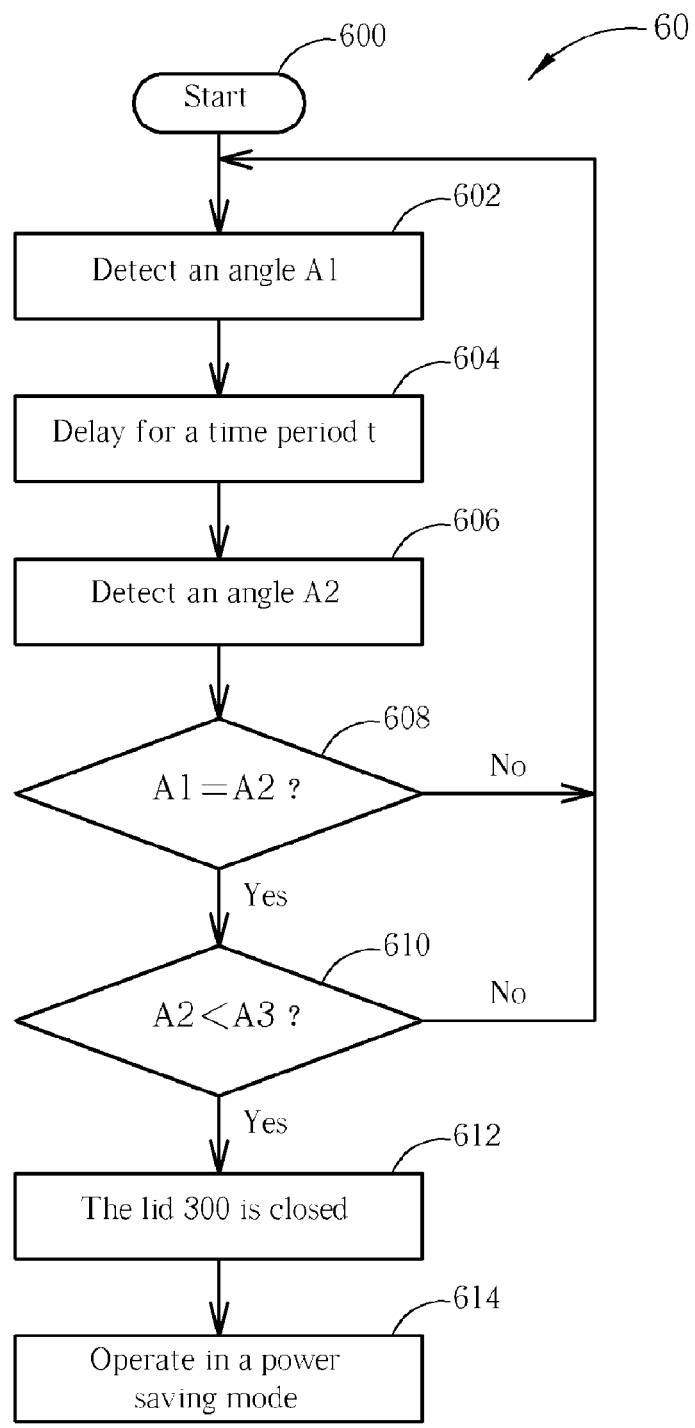

According to the control procedure 50, the control device 40 precisely determines the absolute angle of the lid 300 and controls the operation of the notebook computer system 30. In order to prevent from an incorrect determination of power saving mode by moving the notebook computer system 30 and making the notebook computer system 30 unstable on a horizontal plane during usage, the present invention further provides a control method. Please refer to FIG. 6. FIG. 6 is a flowchart of a control procedure 60 according to an embodiment of the present invention. The control procedure 60 is utilized in the control device 40 for controlling the operation of the notebook computer system 30, and comprises the following steps:

Step 600: Start.

Step 602: Detect an angle A1 between the lid 300 and the plumb line via the gravitational acceleration sensor 400.

Step 604: Delay for a time period t.

Step 606: Detect an angle A2 between the lid 300 and the plumb line via the gravitational acceleration sensor 400.

Step 608: Compare the angle A1 with the angle A2 by the control unit 402. If the angle A1 is equivalent to the angle A2, perform step 610; else, perform step 602.

Step 610: Compare the angle A2 with a closing angle A3 by the control unit 402. If the angle A2 is smaller than the closing angle A3, perform step 612; else, perform step 602.

Step 612: Determine that the lid 300 is closed.

Step 614: Control the notebook computer system 30 to operate in a power saving mode.

Therefore, according to the control procedure 60, the gravitational acceleration sensor 400 first detects the angle A1 and detects the angle A2 after the time period t. Next, if the angle A1 is equivalent to the angle A2, the control unit 402 compares the angle A1 with the closing angle A3 and determines that the lid 300 is closed when the angle A1 is smaller than the closing angle A3, so as to control the notebook computer system 30 to operate in the power saving mode. Simply speaking, in the control procedure 60, the angle A1 and A2 are both absolute angles detected by the gravitational acceleration sensor 400, and the closing angle A3 is a default threshold angle. That is, the lid 300 is determined to be closed when the angle A2 is smaller than the closing angle A3. On the contrary, the lid 300 is determined to be open when the angle A2 is greater than the closing angle A3. Consequently, the control unit 402 can determine the operation of the notebook computer system 30.

Comparing the control procedure 60 with the control procedure 50, it is known that the control procedure 60 is utilized for detecting the angle of the lid 300 twice during the time period t. When the two angles detected during the time period t are equivalent, the control unit 402 can determine that the notebook computer system 30 is not moved, and then, compare the angle of the lid 300 with the closing angle A3. Oppositely, when the two angles detected during the time period t are different, meaning that the notebook computer system 30 is moved, the control unit 402 does not compare the angle of the lid 300 with the closing angle A3. Therefore, according to the control procedure 60, the control device 40 can precisely determine the angle of the lid 300 and prevent from an incorrect determination caused by moving the notebook computer system 30.

Figure 7:
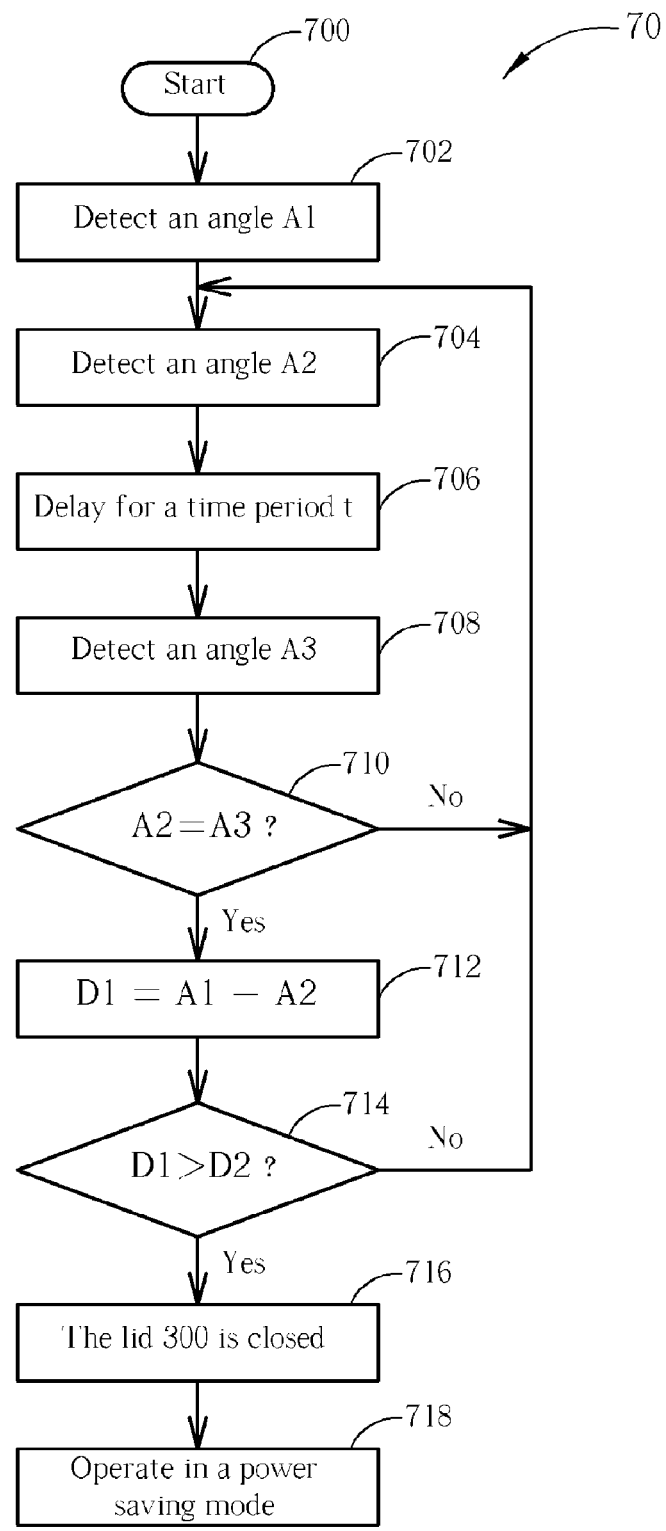

From the above, the control procedure 60 prevents from an incorrect determination caused by moving the notebook computer system 30. However, if a user operates the notebook computer system 30 when the user lies down and needs to look up at the notebook computer system 30, as shown in FIG. 12, the angle between the lid 300 and the plumb line will be smaller than the closing angle and an incorrect determination may still occur even using the control procedure 60. Therefore, the present invention further provides a control procedure. Please refer to FIG. 7. FIG. 7 is a flowchart of a control procedure 70 according to an embodiment of the present invention. The control procedure 70 is utilized in the control device 40 for controlling the operation of the notebook computer system 30, and comprises the following steps:

Step 700: Start.

Step 702: Detect an angle A1 between the lid 300 and the plumb line via the gravitational acceleration sensor 400.

Step 704: Detect an angle A2 between the lid 300 and the plumb line via the gravitational acceleration sensor 400.

Step 706: Delay for a time period t.

Step 708: Detect an angle A3 between the lid 300 and the plumb line via the gravitational acceleration sensor 400.

Step 710: Compare the angle A1 with the angle A2 by the control unit 402. If the angle A2 is equivalent to the angle A3, perform step 712; else, perform step 704.

Step 712: Calculate an angle difference D1 between the angle A1 and the angle A2.

Step 714: Compare the angle difference D1 with a closing angle difference D2 by the control unit 402. If the angle difference D1 is greater than the closing angle difference D2, perform step 716; else, perform step 704.

Step 716: Determine that the lid 300 is closed.

Step 718: Control the notebook computer system 30 to operate in a power saving mode.

Therefore, according to the control procedure 70, the gravitational acceleration sensor 400 first detects the angle A1 and detects the angles A2 and A3 during the time period t. Next, if the angle A2 is equivalent to the angle A3, the control unit 402 compares the angle difference D1 between the angle A1 and the angle A2 with the closing angle difference D2 and determines that the lid 300 is closed when the angle difference D1 is greater than the closing angle difference D2, so as to control the notebook computer system 30 to operate in the power saving mode. Simply speaking, in the control procedure 70, the angle A1 is an absolute angles detected by the gravitational acceleration sensor 400 at the beginning (e.g., at the time when the notebook computer system 30 or the control device 40 is started.) The angle A2 and A3 are absolute angles respectively detected by the gravitational acceleration sensor 400 at different time. The angle difference D1 is an angle difference between the angle A1 and the angle A2. The closing angle difference D2 is a default threshold angle difference. That is, the lid 300 is determined to be closed when the angle difference D1 is greater than the closing angle difference D2. On the contrary, the lid 300 is determined to be open when the angle difference D1 is smaller than the closing angle difference D2. Consequently, the control unit 402 can determine the operation of the notebook computer system 30.

Compare the control procedure 70 with the control procedure 60, it is known that the control procedure 60 is utilized for detecting the angle A1, and then detecting the angle of the lid 300 twice during the time period t. When the two angles detected during the time period t are equivalent, the control unit 402 first determines that the notebook computer system 30 is not moved, and determines whether the lid 300 is closed. Oppositely, when the two angles detected during the time period t are different, meaning that the notebook computer system 30 is moved, the control unit 402 does not determine whether the lid 300 is closed. As a result, according to the control procedure 70, the control device 40 can precisely determine the angle of the lid 300 and prevents from an incorrect determination caused by moving the notebook computer system 30. At the same time, even if a user operates the notebook computer system 30 when the user lies down and needs to look up at the notebook computer system 30, the control procedure 70 can still determine whether the lid 300 is closed by comparing the angle difference D1 with the closing angle difference D2.

Figure 8:
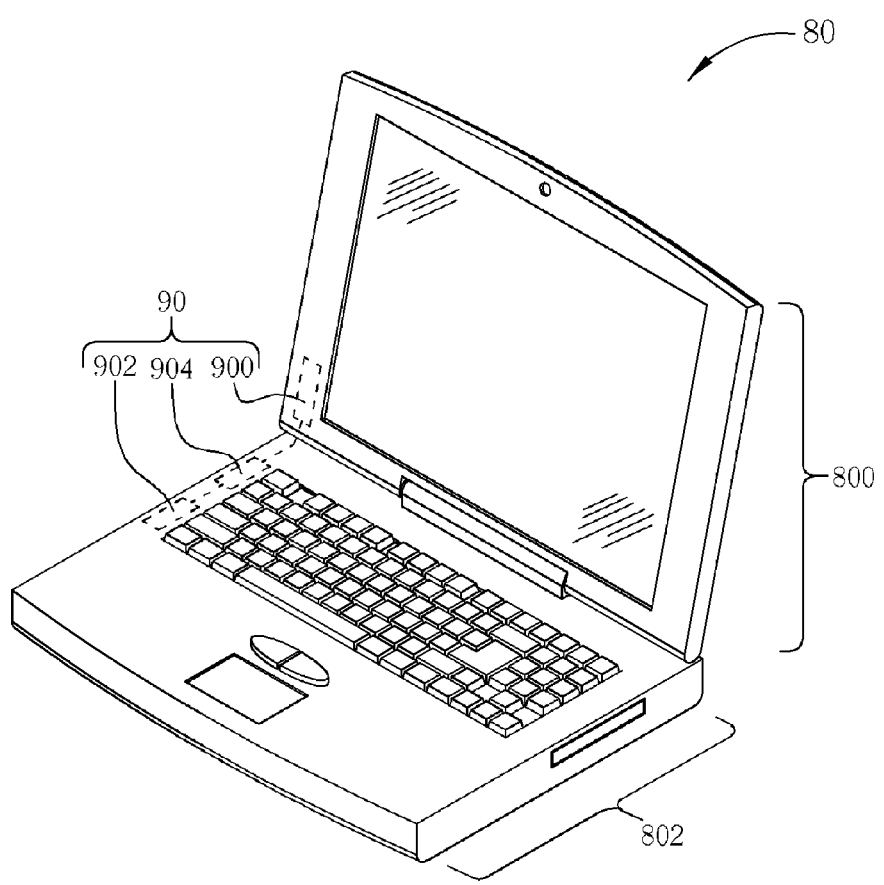
FIG. 8 is a schematic diagram of a notebook computer system according to an embodiment of the present invention.
Figure 9:
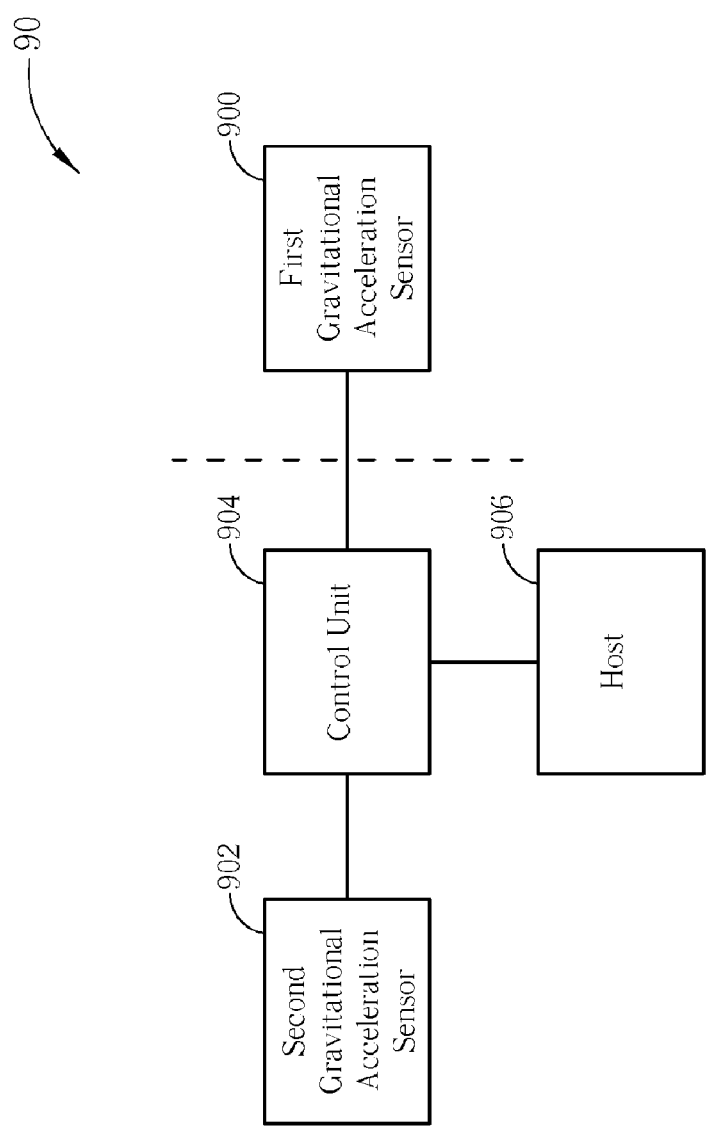
FIG. 9 is a block diagram of a control device in FIG. 8.

In the notebook computer system 30 shown in FIG. 3, the control device 40 uses only a gravitational acceleration sensor to detect the angle of the lid 300. In addition, the present invention can use more than two gravitational acceleration sensors to detect the angle of the lid 300, so as to enhance accuracy. Please refer to FIG. 8. FIG. 8 is a schematic diagram of a notebook computer system 80 according to an embodiment of the present invention. The notebook computer system 80 can timely switch operation to save power. The notebook computer system 80 comprises a lid 800, a base 802 and an operating mode control device 90. The lid 800 comprises a display, a camera, etc. The base 802 comprises a keyboard, a touch panel, a power switch, a host, an expanding interface, and so on. Please refer to FIG. 9. FIG. 9 is a block diagram of the control device 90. The control device 90 is coupled to a host 906 of the notebook computer system 80 and comprises a first gravitational acceleration sensor 900, a second gravitational acceleration sensor 902 and a control unit 904. The first gravitational acceleration sensor 900 is installed in the lid 800 of the notebook computer system 80 for detecting an angle between the lid 800 and the plumb line and outputting a result, such as voltage signals or current signals, to the control unit 904. The second gravitational acceleration sensor 902 is installed in the base 802 of the notebook computer system 80 for detecting an angle between the base 802 and the plumb line and outputting a result, such as voltage signals or current signals, to the control unit 904. The control unit 904 is preferably installed in a keyboard controller of the notebook computer system 80 for controlling the operation of the notebook computer system 80 according to the results detected by the first gravitational acceleration sensor 900 and the second gravitational acceleration sensor 902.

Figure 10:
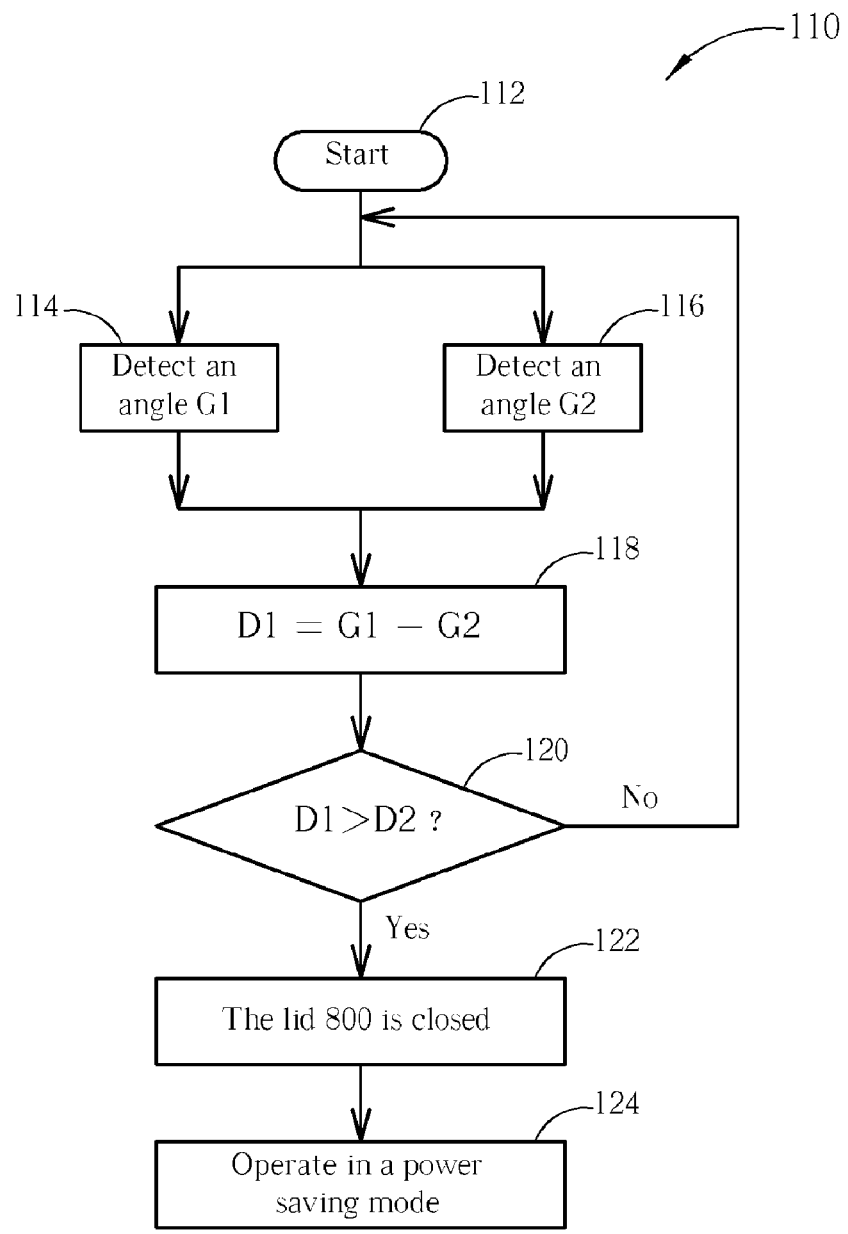
FIG. 10 is a flowchart of a control procedure according to an embodiment of the present invention.

Therefore, using the control device 90, the notebook computer system 80 detects the angle between the lid 800 and the plumb line via the first gravitational acceleration sensor 900, and detects the angle between the base 802 and the plumb line via the second gravitational acceleration sensor 902, so as to determine whether the lid 800 is open. Note that, methods for determining whether the lid 800 is open are not limited by specific procedures or steps, and those skilled in the art can design demanded determination procedures. For example, please refer to FIG. 10. FIG. 10 is a flowchart of a control procedure 110 according to an embodiment of the present invention. The control procedure 110 is utilized in the control device 90 for controlling the operation of the notebook computer system 80, and comprises the following steps:

Step 112: Start.

Step 114: Detect an angle G1 between the lid 800 and the plumb line via the first gravitational acceleration sensor 900.

Step 116: Detect an angle G2 between the base 802 and the plumb line via the second gravitational acceleration sensor 902.

Step 118: Calculate an angle difference D1 between the angle G1 and the angle G2 by the control unit 904.

Step 120: Compare the angle difference D1 with a closing angle difference D2 by the control unit 904. If the angle difference D1 is greater than the closing angle difference D2, perform step 122; else, perform steps 114 and 116.

Step 122: Determine that the lid 800 is closed.

Step 124: Control the notebook computer system 80 to operate in a power saving mode.

Therefore, according to the control procedure 110, the first gravitational acceleration sensor 900 and the second gravitational acceleration sensor 902 respectively detect the angle G1 and the angle G2, and then, the control unit 904 calculates the angle difference D1 between the angle G1 and the angle G2. Next, the control unit 904 compares the angle difference D1 with the closing angle difference D2, and determines that the lid 800 is closed when the angle difference D1 is greater than the closing angle difference D2, so as to control the notebook computer system 80 to operate in the power saving mode. Simply speaking, in the control procedure 110, the angle G1 and the angle G2 are respectively absolute angles detected by the first gravitational acceleration sensor 900 and the second gravitational acceleration sensor 902. The difference between the angle G1 and the angle G2 is the angle difference D1. The closing angle difference D2 is a default threshold angle difference. That is, the lid 800 is determined to be closed when the angle difference D1 is greater than the closing angle difference D2. On the contrary, the lid 800 is determined to be open when the angle difference D1 is smaller than the closing angle difference D2. Consequently, the control unit 904 can determine the operation of the notebook computer system 80.

As a result, according to the control procedure 70, even if a user operates the notebook computer system 80 when the user lies down and needs to look up at the notebook computer system 80, or moves the notebook computer system 80 during usage, the control device 90 can still determine whether the lid 800 is closed by comparing the angle difference D1 with the closing angle difference D2.

In conclusion, the present invention can determine whether the lid of the notebook computer system is open by switching operation, so as to prevent from mechanic weariness and malfunction; therefore, it is getting easier to design the notebook computer system.

Those skilled in the art will readily observe that numerous modifications and alterations of the device and method may be made while retaining the teachings of the invention.

What is claimed is:

1. A method for controlling operation of a portable electronic device comprising:
   detecting an angle between a lid of the portable electronic device and a plumb line perpendicular to a horizontal line along a horizontal direction in a surface of the earth, wherein the plumb line is always perpendicular to the horizontal line along the horizontal direction; and
   controlling the operation of the portable electronic device according to the angle.

2. The method of claim 1, wherein controlling the operation of the portable electronic device according to the angle comprises controlling the portable electronic device to operate in a power saving mode when the angle is smaller than a closing angle.

3. The method of claim 1, wherein controlling the operation of the portable electronic device according to the angle comprises:
   comparing a second angle between the lid and the plumb line with a closing angle for generating a comparison result when a first angle between the lid and the plumb line is equivalent to the second angle; and
   controlling the operation of the portable electronic device according to the comparison result.

4. The method of claim 3, wherein a time point when detecting the second angle is later than a time point when detecting the first angle.

5. The method of claim 3, wherein controlling the operation of the portable electronic device according to the comparison result is controlling the portable electronic device to operate in a power saving mode when the comparison result indicates that the second angle is smaller than the closing angle.

6. The method of claim 1, wherein controlling the operation of the portable electronic device according to the angle comprises:
comparing a second angle between the lid and the plumb line with a third angle for generating an angle difference when a first angle between the lid and the plumb line is equivalent to the second angle;
comparing the angle difference with a closing angle difference for generating a comparison result; and
controlling the operation of the portable electronic device according to the comparison result.

7. The method of claim 6, wherein a time point when detecting the first angle is later than a time point when detecting the third angle, and a time point when detecting the second angle is later than the time point when detecting the first angle.

8. The method of claim 6, wherein controlling the operation of the portable electronic device according to the comparison result is controlling the portable electronic device to operate in a power saving mode when the comparison result indicates that the angle difference is greater than the closing angle difference.

9. A control device for a portable electronic device comprising:
a gravitational acceleration sensor installed in a lid of the portable electronic device for detecting an angle between the lid and a plumb line perpendicular to a horizontal line along horizontal direction in a surface of the earth, wherein the plumb line is always perpendicular to the horizontal line along the horizontal direction; and
a control unit coupled to the gravitational acceleration sensor and a host of the portable electronic device for controlling operation of the portable electronic device according to the angle.

10. The control device of claim 9, wherein the control unit is utilized for controlling the portable electronic device to operate in a power saving mode when the angle is smaller than a closing angle.

11. The control device of claim 9, wherein the control unit is utilized for comparing a second angle between the lid and the plumb line with a closing angle for generating a comparison result when a first angle between the lid and the plumb line is equivalent to the second angle, and controlling the operation of the portable electronic device according to the comparison result.

12. The control device of claim 11, wherein a time point when detecting the second angle is later than a time point when detecting the first angle.

13. The control device of claim 11, wherein the control unit is utilized for controlling the portable electronic device to operate in a power saving mode when the comparison result indicates that the second angle is smaller than the closing angle.

14. The control device of claim 9, wherein the control unit is utilized for comparing a second angle between the lid and the plumb line with a third angle for generating an angle difference when a first angle between the lid and the plumb line is equivalent to the second angle, comparing the angle difference with a closing angle difference for generating a comparison result, and controlling the operation of the portable electronic device according to the comparison result.

15. The control device of claim 14, wherein a time point when detecting the first angle is later than a time point when detecting the third angle, and a time point when detecting the second angle is later than the time point when detecting the first angle.

16. The control device of claim 14, wherein the control unit is utilized for controlling the portable electronic device to operate in a power saving mode when the comparison result indicates that the angle difference is greater than the closing angle difference.

17. The control device of claim 14, wherein the portable electronic device is a notebook computer.

18. A method for controlling operation of a portable electronic device comprising:
detecting a first angle between a lid of the portable electronic device and a plumb line perpendicular to a horizontal line along a horizontal direction in a surface of the earth, wherein the plumb line is always perpendicular to the horizontal line along the horizontal direction;
detecting a second angle between a base of the portable electronic device and the plumb line; and
controlling the operation of the portable electronic device according to the first angle and the second angle.

19. The method of claim 18, wherein controlling the operation of the portable electronic device according to the first angle and the second angle comprises:
comparing the first angle with the second angle for generating an angle difference;
comparing the angle difference with a closing angle difference for generating a comparison result; and
controlling the operation of the portable electronic device according to the comparison result.

20. The method of claim 19, wherein controlling the operation of the portable electronic device according to the comparison result is controlling the portable electronic device to operate in a power saving mode when the comparison result indicates that the angle difference is greater than the closing angle difference.

21. A control device for a portable electronic device comprising:
a first gravitational acceleration sensor installed in a lid of the portable electronic device for detecting a first angle between the lid and a plumb line perpendicular to a horizontal line along a horizontal direction in a surface of the earth, wherein the plumb line is always perpendicular to the horizontal line along the horizontal direction;
a second gravitational acceleration sensor installed in a base of the portable electronic device for detecting a second angle between the base and the plumb line; and
a control unit coupled to the first gravitational acceleration sensor, the second gravitational acceleration sensor and a host of the portable electronic device, for controlling operation of the portable electronic device according to the first angle and the second angle.

22. The control device of claim 21, wherein the control unit is utilized for comparing the first angle with the second angle for generating an angle difference, comparing the angle difference with a closing angle difference for generating a comparison result, and controlling the operation of the portable electronic device according to the comparison result.

23. The control device of claim 22, wherein the control unit is utilized for controlling the portable electronic device to operate in a power saving mode when the comparison result indicates that the angle difference is greater than the closing angle difference.

24. The control device of claim 21, wherein the portable electronic device is a notebook computer.

* * * * *